United States Patent Office 2,935,341
Patented May 3, 1960

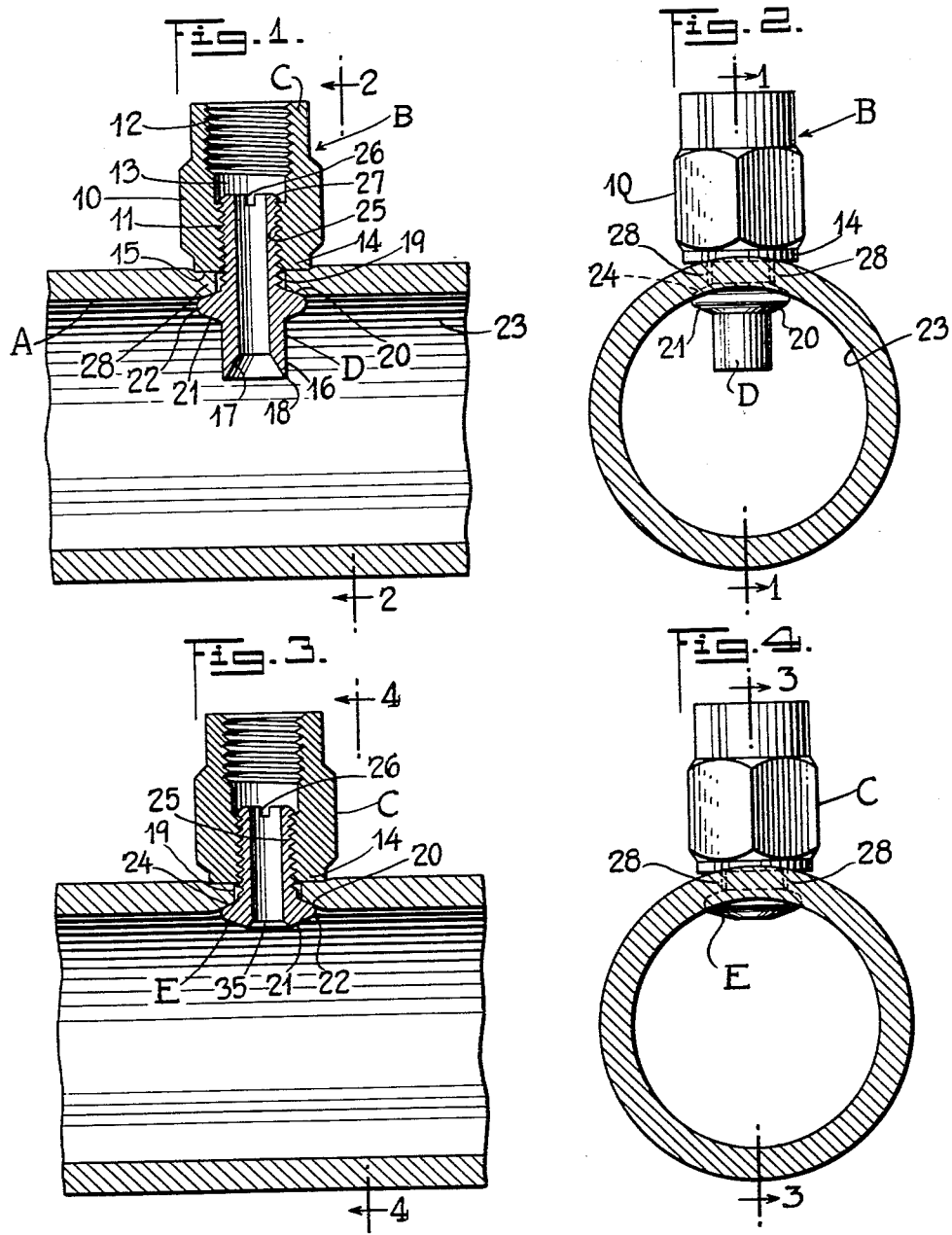

2,935,341

NOZZLE MOUNTING WITH AUTOMATIC LOCK FOR FLEXIBLE PLASTIC TUBING OR HOSE

William F. Steinen, Short Hills, N.J.

Application August 19, 1957, Serial No. 678,860

1 Claim. (Cl. 285—18)

The present invention relates to nozzle mounting adapter assembly with an automatic lock for flexible tubing or hose.

In a run of flexible tubing or hose made of plastic or rubber materials, it is desirable that means be provided for mounting nozzles thereon in desired positions or places where such tubing or hose is used for sprinkling or watering purposes, particularly for greenhouses or irrigation adaptations.

It is among the objects of the present invention to provide a simple, durable, readily applied nozzle mounting with an automatic lock for such flexible plastic tubing or hose, which may be readily applied at desired locations to give the desired spacing of nozzles or sprinkling heads and to assure that there will not be undue leakage or difficulty in attaching such nozzles or sprinkling connections.

Another object is to provide a system of mounting nozzles on plastic hose or pipe which will not require special tools and which will permit such nozzle connections or branch connections to be readily applied in liquid tube fashion with assurance of elimination of leakage and without excessive piercing or damage to the tube or hose.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been most satisfactory to provide a two-piece nozzle adapter arrangement, a larger piece being adjusted on the outside of the flexible tubing or hosing and a smaller inside adapter element being positioned partly on the inside and partly on the outside to connect with the outer element.

The outer element is preferably a tubular member of hexagonal or other polygonal structure which is desirably provided with interior threading at both ends thereof.

In one preferred form the interior threading adjacent the tubing end of the outside element is of smaller diameter than the interior threading at the outside end.

The interior element which transverses the wall of the tubing desirably has an exteriorly threaded portion to fit into the interiorly threaded portion of the outside element.

Desirably, the peripheral lip or outward extension is provided intermediately of the length of the interior element which will serve to seal the opening in the wall of the tubing or piping where the T connection is positioned.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Fig. 1 is a transverse longitudinal sectional view of one form of nozzle mounting, the adapter placed upon the wall of the flexible tube or piping, taken upon the line 1—1 of Fig. 2.

Fig. 2 is an end elevational view taken upon the line 2—2 of Fig. 1.

Fig. 3 is a longitudinal sectional view similar to Fig. 1 and of an alternative embodiment, taken upon the line 3—3 of Fig. 4.

Fig. 4 is a side elevational view taken upon the line 4—4 of Fig. 3.

Referring to Figs. 1 and 2, there is shown the flexible tubing or housing A and the nozzle mounting adapter B having an exterior element C and an interior element D.

The tubing A may be formed of a synthetic plastic material which is extruded or otherwise formed into piping or tubing.

The outer nozzle adapter element C has a hexagonal or polygonal body 10 with a reduced diameter interiorly threaded inside end 11 and with an interiorly threaded outside end 12. An unthreaded chamber portion will be formed between the threaded sections 11 and 12 interiorly of the polygonal portion 10.

The inside end 14 of the fitting element C will contact and form a recess 15 in the side wall of the tubing A.

The inner element D has an inside or lower cutting edge 16 with the beveled face 17 and the sharp edge 18. This may be used to cut the openings 19 in the wall of the piping or tubing A if no other tool is available or if it is desired to have the nozzle mounting adapter assembly cut its own hole or opening 19 in the wall of the tubing A.

Intermediate of the length of the inside element D will be the outwardly extending lip 19 with the upper beveled face 20 and the lower beveled face 21, which meet at a circular peak 22.

The face 20, together with the peak 22, as shown in Figs. 1 and 2, will press itself into the inside face 23 of the tubing, forming a sealing recess 24. This recess may be tightened to compress the tubing A around the opening 19 by the threaded portion 25 which is threaded into the screw threaded portion 11 of the outer element C.

At the end of the element D is the fillister slot 26 which enables the lip face 20 to be forced into the recess 24 and achieve the desired amount of sealing. If desired, the elements C and D may be assembled together with the element D threaded partly out of the tap recess 11.

Then with the opening 19 being cut in the wall A with a separate tool or with the sharp edge 18, the element is then forced into the opening 19 with the bulge portion 20—21—22 being forced through said opening 19 and then snapping inside of the wall of the tubing A, which should have sufficient flexibility to expand around the bulge 20—21—22.

Then a tool may be applied to the wall 26 to pry up the bulge 20—21—22 into the recess 23, forcing the edge 14 into the recess 15 and obtaining a lock-tight connection.

If it is desired to permanently lock the adapter B in position, the short edges may be staked at position 27.

Otherwise the inside element or stud D may be threaded outwardly to remove the compression in the area 28 and then snapped out of the tubing or piping A.

In the alternative construction of Figs. 3 and 4, the outside adapter element C is of the same construction as described in Figs. 1 and 2. The inside element has the same threaded portion 25, the fillister slot 26 and the sealing peripheral extension lip 20—21—22.

However, the lower extension of the inside element E has been eliminated and the oblique face 21 terminates in the countersink portion 35. In the unit as shown in Fig. 3, the cutting edge 18 is missing and therefore the openings 19 in the side wall of the piping should be cut by a separate tool.

Both of the units of Figs. 1 and 2 and of Figs. 3 and 4, however, will form a seal by jamming or compressing the pipe in the area 28 between the lip 20—21—22 and the lower portion 14 of the outer element C.

This lip is at the end of the inside stud element in Figs. 3 and 4, but is intermediate of the inside stud element in Figs. 1 and 2. The pulling tight of the lip elements 20—21—22 in either embodiment of Figs. 1 to 4 will form a watertight or liquid-tight seal on the piping.

The arrangement shown is particularly designed for nozzle mounting adapter assemblies with automatic locks for flexible tubes or flexible hose, particularly of synthetic plastic materials.

By means of the present invention, the holes to receive the adapter assemblies may be cut by separate tools or by the adapter assemblies themselves and the sealing lips 20—21—22 may be forced into the holes and after they have been snapped through may be tightened around the periphery of the opening in the side wall of the tubing to give a tight connection.

It is thus apparent that the applicant has provided a novel arrangement for mounting branch connections or nozzle connections upon plastic tubing which is simple and readily applied and will give the desired placement and location of spray nozzles or other types of liquid outlets.

As many changes could be made in the above nozzle mounting with automatic lock for flexible plastic tubing or hose, and many widely different embodiments of this invention could be made without departure from the scope of the claim, it is intended that all matters contained in the above description shall be interpreted as illustrative and not in a limiting sense.

Having now particularly described and ascertained the nature of the invention, and in what manner the same is to be performed, what is claimed is:

A nozzle for tubular plastic pipe comprising an outer tubular clamping nipple having a central enlarged hexagonal portion and end portions of reduced diameter, and a central through passage of enlarged diameter at the outer end and of reduced diameter at the inner end, both ends being interiorly threaded, the inner end of the nipple having a transverse clamping face and an inside tubular clamping tube having an externally threaded end portion screwed into the interiorly threaded reduced diameter inner end of the nipple, an outwardly projecting lip having a clamping face adjacent said threaded end portion integrally formed on said tube, said lip having a semi-circularly rounded outer edge and a conical face opposite said clamping face, said conical face converging in a direction opposite to said externally threaded end portion, said transverse clamping face of the nipple and said clamping face of the lip being adapted to clamp the pipe therebetween, said inside tubular clamping tube having a second end portion of smooth exteriorly cylindrical configuration and of a lesser diameter than said lip extending from said conical face and having an interior bevel forming a cutting edge at its extremity.

References Cited in the file of this patent

UNITED STATES PATENTS

| | | |
|---|---|---|
| 499,956 | Berry | June 20, 1893 |
| 1,160,168 | Henderson | Nov. 16, 1915 |
| 1,222,806 | Schmitt | Apr. 17, 1917 |
| 1,527,831 | Bourgner | Feb. 24, 1925 |
| 1,755,104 | Deierlein | Apr. 15, 1930 |
| 1,887,423 | Parker | Nov. 8, 1932 |
| 2,266,393 | Hoffman | Dec. 16, 1941 |
| 2,355,871 | Kraft | Aug. 15, 1944 |
| 2,736,335 | Webber | Feb. 28, 1956 |

FOREIGN PATENTS

| | | |
|---|---|---|
| 926,784 | France | Apr. 21, 1947 |